United States Patent
Avila

(10) Patent No.: US 10,486,262 B2
(45) Date of Patent: Nov. 26, 2019

(54) METHOD AND SYSTEM FOR JOINING WORKPIECES

(71) Applicant: Carrier Corporation, Farmington, CT (US)

(72) Inventor: Luis Felipe Avila, Manlius, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 1418 days.

(21) Appl. No.: 13/890,690

(22) Filed: May 9, 2013

(65) Prior Publication Data

US 2014/0014648 A1 Jan. 16, 2014

Related U.S. Application Data

(60) Provisional application No. 61/670,176, filed on Jul. 11, 2012.

(51) Int. Cl.
*B23K 13/01* (2006.01)
*B23K 1/012* (2006.01)
*B23K 3/08* (2006.01)
*B23K 1/00* (2006.01)
*B23K 1/002* (2006.01)
*B23K 3/047* (2006.01)
*B23K 37/02* (2006.01)

(52) U.S. Cl.
CPC .............. *B23K 13/01* (2013.01); *B23K 1/002* (2013.01); *B23K 1/0012* (2013.01); *B23K 1/012* (2013.01); *B23K 3/0475* (2013.01); *B23K 3/08* (2013.01); *B23K 37/0229* (2013.01)

(58) Field of Classification Search
CPC ...... B23K 13/01; B23K 1/0012; B23K 1/002; B23K 1/012; B23K 3/0475; B23K 3/08; B23K 37/0229
USPC .......................... 219/608, 615–617; 228/102
See application file for complete search history.

(56) References Cited

U.S. PATENT DOCUMENTS

| | | | |
|---|---|---|---|
| 3,365,563 A | 1/1968 | Basinger | |
| 4,901,909 A | 2/1990 | George | |
| 5,031,819 A | 7/1991 | Weon et al. | |
| 5,125,555 A | 6/1992 | Grisoni et al. | |
| 5,902,507 A * | 5/1999 | Wiezbowski | B23K 1/002 219/615 |
| 6,325,276 B1 | 12/2001 | Kawano et al. | |
| 6,781,084 B2 | 8/2004 | Brockman et al. | |
| 6,783,056 B2 | 8/2004 | Kouno et al. | |

(Continued)

FOREIGN PATENT DOCUMENTS

| CA | 263439 A | 8/1926 |
|---|---|---|
| CN | 1044912 A | 12/1989 |

(Continued)

*Primary Examiner* — Dana Ross
*Assistant Examiner* — James F Sims, III
(74) *Attorney, Agent, or Firm* — Cantor Colburn LLP

(57) ABSTRACT

A system for joining articles includes a joining unit; a positioning unit coupled to the joining unit, the positioning unit positioning the joining unit; a vision system obtaining an image of an item to be joined on a workpiece; a controller for processing the image and controlling a position of the joining unit relative to the item to be joined in response to the image; and a temperature probe for monitoring a temperature; wherein the controller adjusts the position of the joining unit in response to the temperature.

10 Claims, 6 Drawing Sheets

(56) References Cited

U.S. PATENT DOCUMENTS

| | | | |
|---|---|---|---|
| 6,871,771 B2 | 3/2005 | Tonjes et al. | |
| 7,368,035 B2 | 5/2008 | Wang et al. | |
| 8,057,053 B2 * | 11/2011 | Hauf | G02B 7/1815 |
| | | | 359/845 |
| 8,383,978 B2 * | 2/2013 | Fukutani | B23K 13/025 |
| | | | 138/171 |
| 8,715,772 B2 * | 5/2014 | Zurecki | C21D 1/613 |
| | | | 219/121.47 |
| 2003/0201302 A1 * | 10/2003 | Tonjes | B23K 1/0012 |
| | | | 228/10 |
| 2004/0173584 A1 * | 9/2004 | Onishi | C03B 23/043 |
| | | | 219/121.55 |
| 2005/0199615 A1 | 9/2005 | Barber et al. | |
| 2010/0176106 A1 | 7/2010 | Christensen et al. | |
| 2011/0114704 A1 * | 5/2011 | Sugawara | B23K 20/007 |
| | | | 228/102 |

FOREIGN PATENT DOCUMENTS

| | | |
|---|---|---|
| CN | 2215371 Y | 12/1995 |
| CN | 101378877 A | 3/2009 |
| CN | 201483168 | 5/2010 |
| DE | 4019954 | 6/1990 |
| GB | 2368813 | 5/2002 |
| JP | 60124467 | 7/1985 |
| JP | 63080964 | 4/1988 |
| JP | 63-144860 | 6/1988 |
| JP | 02142674 | 5/1990 |
| JP | 06071428 | 3/1994 |
| JP | 06126438 | 5/1994 |
| JP | 06182531 | 7/1994 |
| JP | 06262345 | 9/1994 |
| JP | 06285625 | 10/1994 |
| JP | 06297137 | 10/1994 |
| JP | 06297141 | 10/1994 |
| JP | 08-332564 | 12/1996 |
| JP | 09-066358 | 3/1997 |
| KR | 100303244 | 7/2001 |
| KR | 20030085706 | 11/2003 |
| KR | 100767071 | 10/2007 |
| KR | 100877608 | 1/2009 |
| KR | 20110125707 | 11/2011 |
| WO | 2007090404 | 8/2007 |

* cited by examiner

METHOD AND SYSTEM FOR JOINING WORKPIECES

CROSS-REFERENCE TO RELATED APPLICATIONS

This application claims the benefit of U.S. Provisional patent application Ser. No. 61/670,176, filed Jul. 11, 2012, the entire content of which is incorporated herein by reference.

BACKGROUND

The subject matter disclosed herein generally relates to joining workpieces, and in particular to a method and system for joining aluminum workpieces.

Brazing is one technique to join workpieces. Brazing is used to join metal workpieces by heating a joint of the workpieces (e.g., via a torch) and applying a filler to the joint once the workpieces have reached a suitable temperature, or by fusing both parts together. The filler melts into the joint, and when cooled creates a mechanical attachment between the workpieces.

Controlling heat during brazing can be challenging when working with certain materials. There exist automatic brazing systems, but complicated shapes or hard to reach joints are particularly challenging for automated brazing systems. Overheating and melting of the part is easy to do especially when the window between the base metal alloy melt point and the melting point for the brazing materials is close. This challenge makes the use of manual brazing for complicated or hard to access joints the preferred method, at the expense of cycle time and cost. Manual joining quality is highly dependent on operator skills. Existing automated joining systems are in use for simple geometries, but are not as effective or reliable for hard to reach joints or parts with high variability (e.g., manually assembled parts).

BRIEF DESCRIPTION OF THE INVENTION

One embodiment is a system for joining articles including a joining unit; a positioning unit coupled to the joining unit, the positioning unit positioning the joining unit; a vision system obtaining an image of an item to be joined on a workpiece; a controller for processing the image and controlling a position of the joining unit relative to the item to be joined in response to the image; and a temperature probe for monitoring a temperature; wherein the controller adjusts the position of the joining unit in response to the temperature.

Another embodiment is a method for joining articles, the method including obtaining an image of an item to be joined on a workpiece; processing the image; positioning a joining unit relative to the item to be joined on the workpiece in response to processing the image; monitoring a temperature; and adjusting the position of the joining unit in response to the temperature.

DETAILED DESCRIPTION OF THE INVENTION

Figure 1:
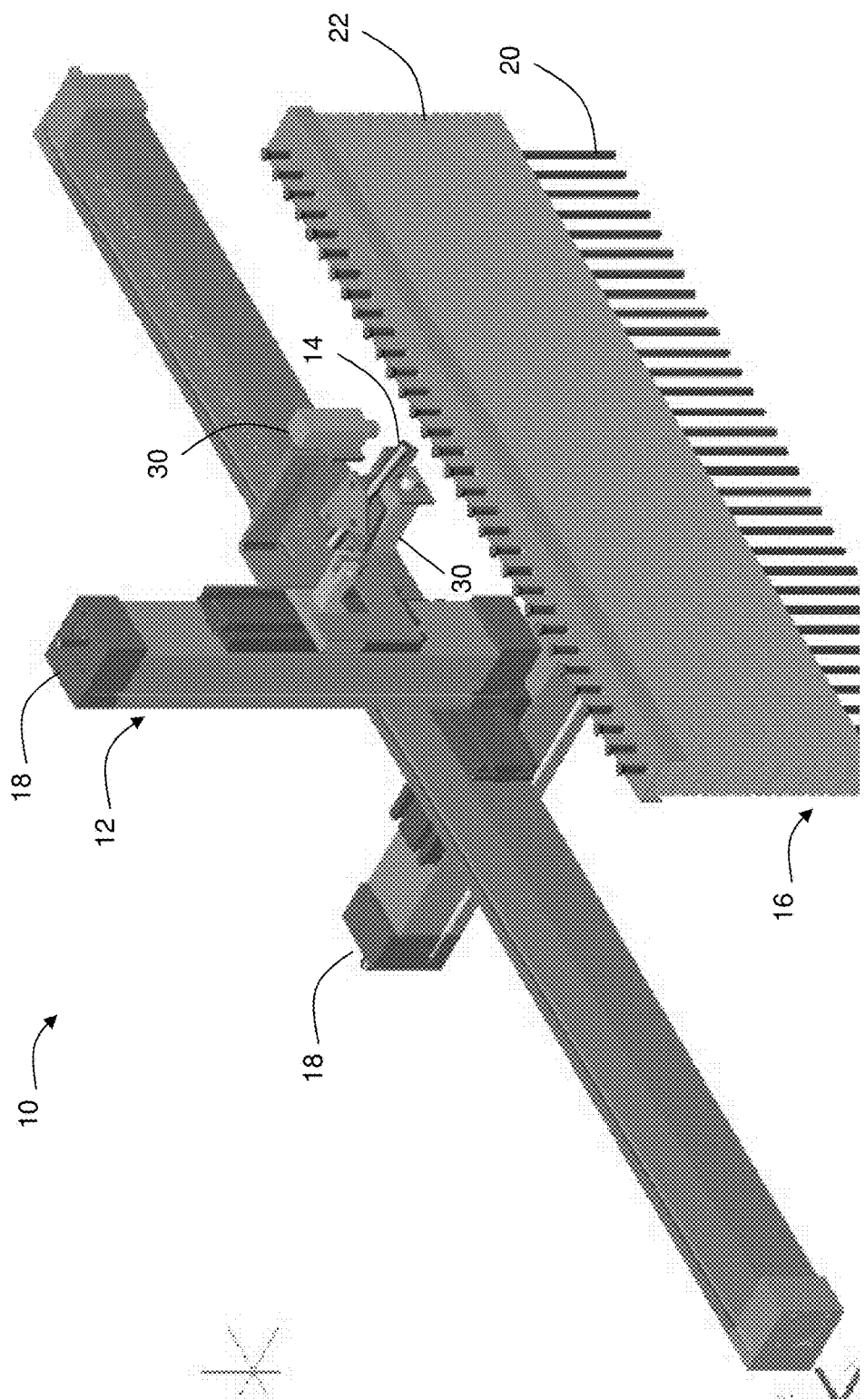
FIG. 1 depicts a joining system in an exemplary embodiment.

FIG. 1 depicts a joining system 10 (e.g., a brazing system) in an exemplary embodiment. In the examples described herein, the joining is achieved by brazing. It is understood that other joining techniques may be used, and embodiments are not limited to brazing.

A positioning unit 12 moves a joining unit 14 (e.g. a brazing unit) to apply heat to a workpiece 16 to join/braze the items on the workpiece 16. The positioning unit 12 positions the brazing unit 14 in three dimensions to position the brazing unit 14 relative to the workpiece 16. The positioning unit 12 may employ axial motion using three, single-axis, modular linear actuators 18. The actuators 18 use internal rail guides and a drive such as a screw, belt or gear. It is understood that the positioning unit 12 may employ other constructions (e.g., a multijointed arm) in order to position brazing unit 14 in three-dimensional space.

Figure 5:
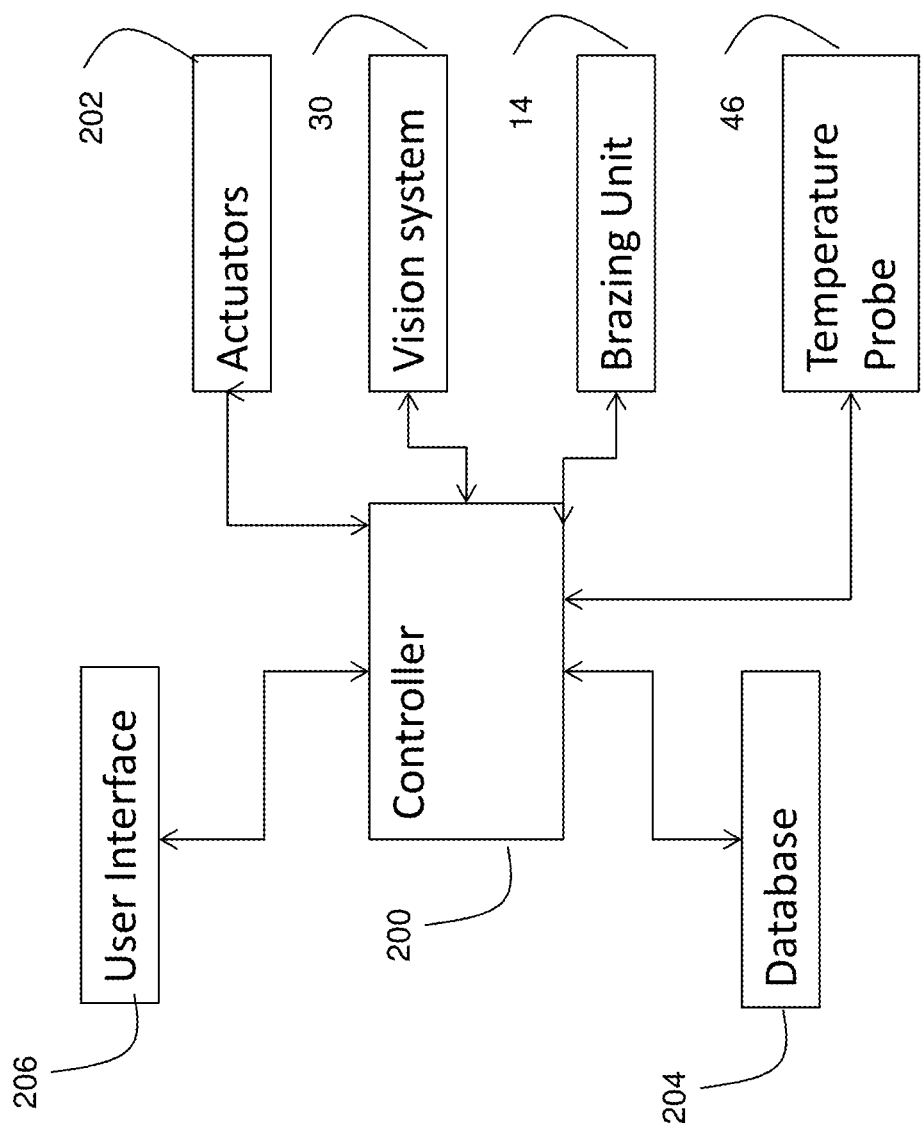
FIG. 5 is a block diagram of a joining system in an exemplary embodiment.

Brazing unit 14 applies heat to an item of the workpiece 16 in response to commands from a controller 200 (FIG. 5). Brazing unit 14 may be implemented using a torch or an induction brazer. Embodiments described herein refer to a torch, but the processes described herein are applicable to induction brazers and other types of brazers. Brazing unit 14 may use known fuel types (e.g., propane, oxy-acetylene, propylene, natural gas, MAPP, hydrogen, LP, acetylene). The fuel type may be any fuel-air/oxygen combination. The fuel-air mix may be adjusted by controller 200 as described in further detail herein.

Workpiece 16, in the example shown in FIG. 1, is a round tube plate fin heat exchanger having a plurality of aluminum hairpin tubes 20 mounted to fins 22. The brazing system 10 brazes an aluminum return bend 24 (FIG. 3) to the tubes 20. Return bend 24 is positioned in a cup 26 formed in one end of tube 20.

One or more vision systems 30 (e.g., cameras) are mounted to the positioning unit 12 to obtain two-dimensional images of the workpiece 16 at a brazing location. Vision systems 30 are positioned, for example, on orthogonal axes to provide a side view and a top view of the workpiece 16. The images from vision systems 30 are processed to detect the location of an item to be brazed on the workpiece and position brazing unit 14 accordingly. Although two vision systems 30 are shown in FIG. 1, a single vision system 30 may be used (e.g., the side view) for location of the workpiece.

Figure 2:
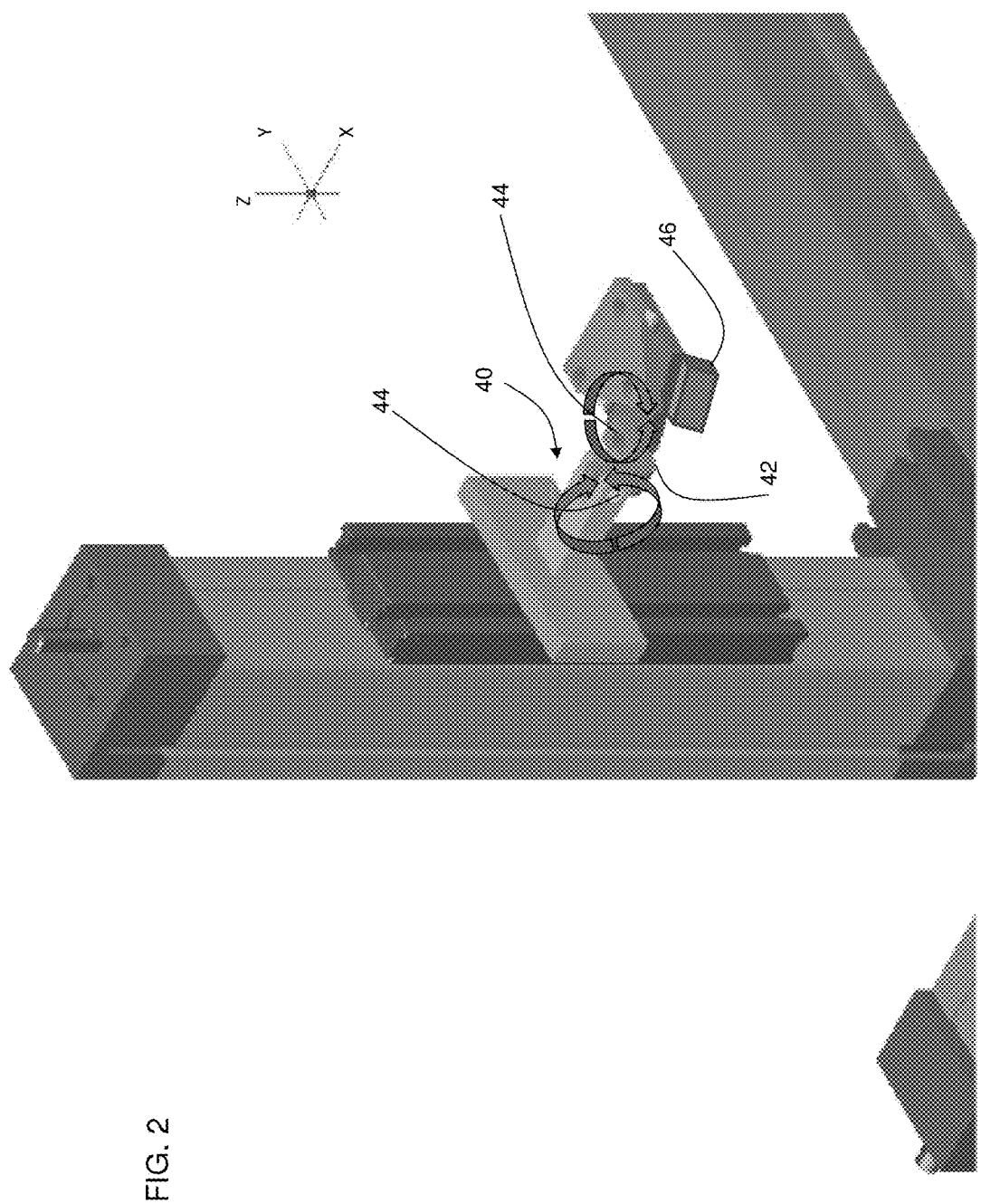
FIG. 2 depicts a gripper in an exemplary embodiment.

Positioning unit 12 includes a gripper 40 for mounting brazing unit 14, shown in FIG. 2. Gripper 40 includes a multi-dimensional linkage 42 that allows for positioning the gripper 40, and thus brazing unit 14, in one or more dimensions. The linkage 42 includes joints 44 that may be adjusted to define a location and orientation in three dimensional space. In one embodiment, joints 44 include set screws that are used to provide rotation about the Y axis and Z axis, as shown in FIG. 2. Joints 44 may also include electrically driven actuators that are adjusted by a controller 200 to position the brazing unit 14 remotely.

Also shown in FIG. 2 is a temperature probe 46. Temperature probe 46 detects a temperature of an item to be brazed on workpiece 16 in order to control the brazing operation. Temperature probe 46 may be implemented using a variety of techniques. In an exemplary embodiment, temperature probe 46 is a contact probe that measures temperature of the workpiece 16 at a location a fixed distance from the projected centerline of the brazing unit 14. In another embodiment, temperature probe 46 is a non-contact probe (e.g., IR or pyromenter) that monitors temperature at a fixed point close to the tube 20 being brazed. This may include using a non-reflective coating on tube 20, to minimize emissivity and reflectivity issues with aluminum. In another embodiment, temperature probe 46 is a photosensor that monitors and detects change in flame color at the proper brazing temperature, if brazing unit 14 includes a torch. Using the change in flame color to detect proper brazing temperature for aluminum is described in further detail in published PCT application, PCT/US11/057192, the contents of which are incorporated herein by reference.

Figure 3:
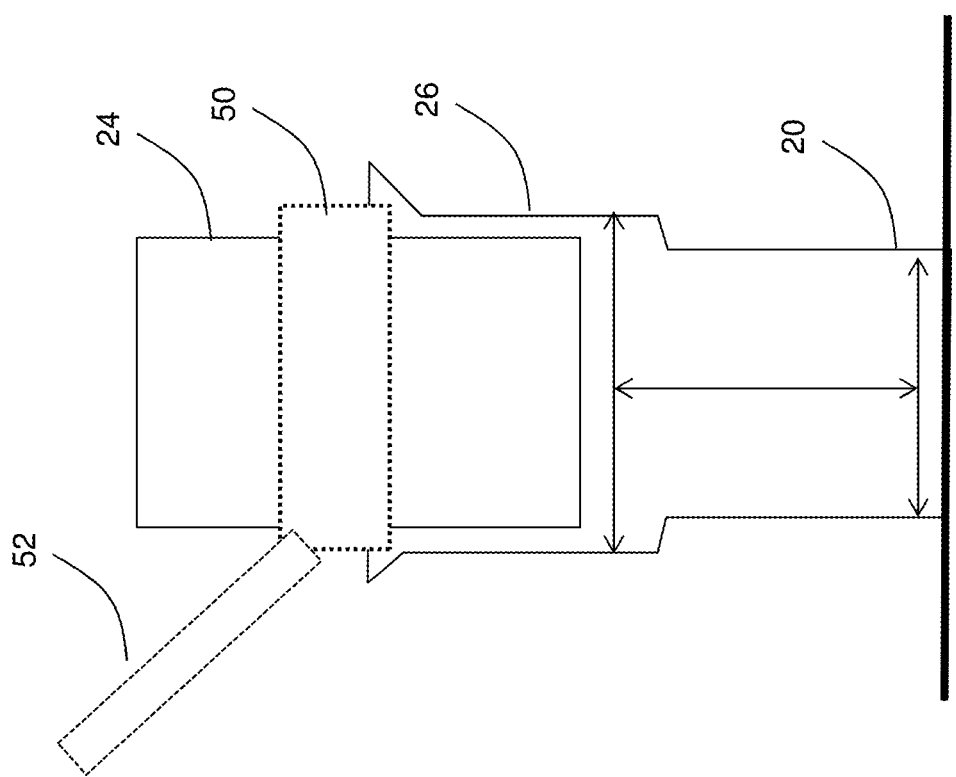
FIG. 3 depicts an item to be joined in an exemplary embodiment.

To properly braze the workpiece 16, the brazing unit 14 is positioned by the positioning unit 12. To determine the location of an item to be brazed on workpiece 16, an image from the vision system 30 is processed by controller 200. FIG. 3 depicts and exemplary image of a side view of tube 20 with return tube 24 positioned therein. Brazing material 50 may be packed in the joint between the return tube 24. Alternatively, brazing material may be provided in the form of a brazing rod 52. If a brazing rod 52 is used, the positioning unit 12 includes a feed unit for delivering the brazing rod to the joint between tube 20 and return tube 24.

Controller 200 (FIG. 5) analyzes the image of the tube 20 to detect the location of the tube 20. Other components of the system may perform image processing functions described herein. For example, vision system 30 may perform pre-processing of an image to provide feature recognition. As such, operations described herein as performed by controller 200 may have portions of those operations performed by other components.

Several techniques may be used to determine the location of tube 20. Feature extraction may be performed on the image to extract features such as the edges of the tube 20 and edges of the cup 26. Once the edges of the tube 20 and cup 26 are located, measurements of the tube width at the tube base, cup width at the cup base and a distance between the tube 20 and cup 26 are acquired from the image as shown in FIG. 3. The measurements from the image are compared to reference values to determine the location of the tube 20 relative to the vision system 30. For example, if the measurement of tube width is greater than an expected reference value, the vision system 30 and tube 20 are too close, and the positioning unit 12 can move away from the tube 20 in the x direction.

Further, pattern matching may be used to compare the acquired image to reference images. Shifts in the Y or Z direction can be detected by overlaps between the acquired image and reference image. The positioning unit 12 can then move to obtain the proper position between the positioning unit 12 and the workpiece 16. An image of a top view of the tube 20 may also be processed to detect features of the tube and then adjust the location of the positioning unit 12 based on measurements from the top view image and/or pattern recognition of the top view image.

Figure 4:
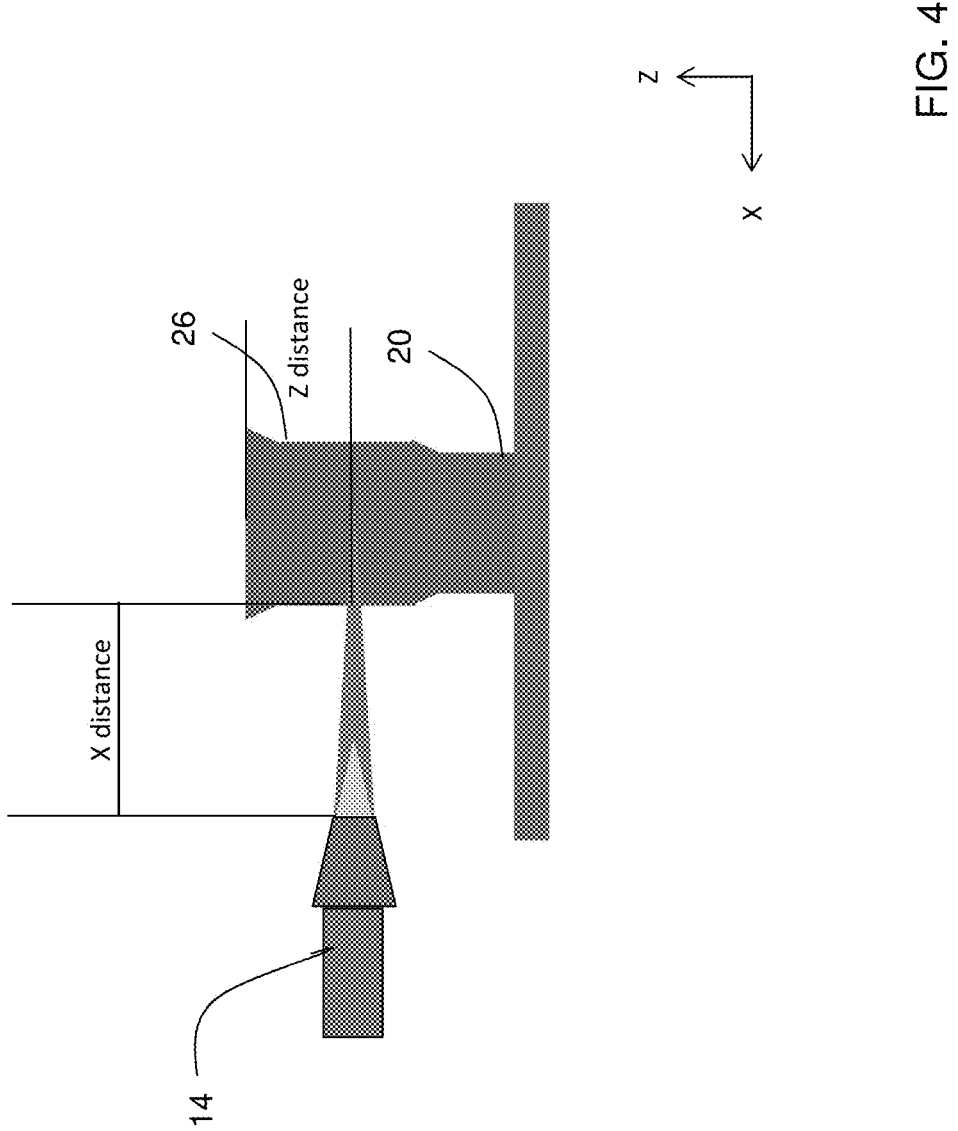
FIG. 4 depicts positioning of a joining unit relative to a workpiece in an exemplary embodiment.

By performing image analysis on the images from the vision system 30, the initial position of positioning unit 12, and thus brazing unit 14, can be established. FIG. 4 shows an exemplary initial position for brazing unit 14 relative to tube 20. The brazing unit 14 is positioned at an x distance from the tube 20 and at a z distance from the top of cup 26. Brazing unit 14 may be centered with tube 20 along the y axis or offset along the y axis as desired. Further, joints 44 in linkage 42 may be set to provide rotation of the brazing unit 14 about the y axis or the z axis, as desired.

FIG. 5 is a block diagram of a brazing system in an exemplary embodiment. The system includes a controller 200 that controls operation of the positioning unit 12 and brazing unit 14. As noted above, other types of joining units may be used, and embodiments are not limited to brazing. Controller 200 may be implemented using a general-purpose microprocessor executing instructions stored in a storage medium to perform the operations described herein. Actuators 202 are part of positioning unit 12, and includes actuators 18 to move the brazing unit 14 in the x, y, and z directions as described above. Actuators 202 may also include joints 44 of linkage 42 so that rotation of the brazing unit 14 about the y and z axes may be remotely controlled.

Vision system 30 corresponds to one or more elements 30 in FIG. 1. Controller 200 obtains images from the vision systems(s) 30 and performs image analysis to locate the position of the tube 20 as described above. As noted above, vision system 30 may perform some of the image analysis. Brazing unit 14 is controlled by controller 200 as well. Controller 200 can alter the output heat of the brazing unit 14 by adjusting a fuel/air mix to a torch or electrical power to an induction brazer. Database 204 stores information about workpieces that is used by controller 200 to automate the brazing process. This information includes characteristics of the workpiece (e.g., distance between tubes 20), expected temperature ranges, time to complete brazing, reference patterns for image pattern matching, etc. These workpiece characteristics are used to control the brazing operation and permit the system to be used on a variety of different types of workpieces without any system reconfiguration. A user interface 206 allows a user to access the controller 200. User interface 206 may include typically computer peripherals such as a keyboard, mouse, display, etc.

Figure 6:
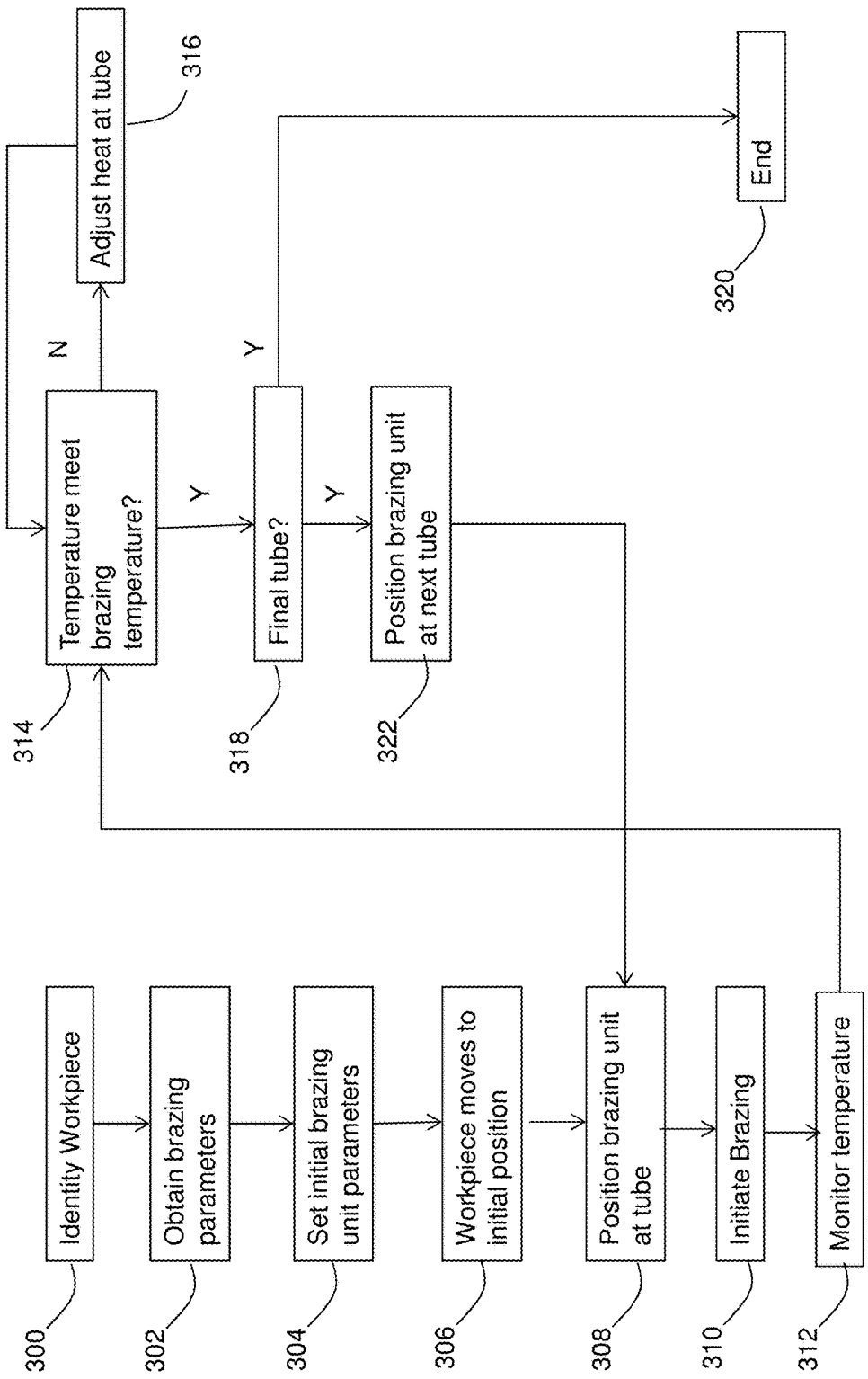
FIG. 6 is a flowchart of a process for joining workpieces in an exemplary embodiment.

FIG. 6 is a flowchart of a process for brazing workpieces in an exemplary embodiment. The example of FIG. 6 is directed to brazing, but other joining techniques may be used. The process begins at 300 where the workpiece to be brazed is identified. This may be performed by reading an identifier on the workpiece (e.g., a barcode) or by entering a workpiece identifier through user interface 206.

At 302, brazing parameters for the workpiece are obtained from database 204 based on the workpiece identifier. The brazing parameters include a number of items such as the initial position of brazing unit 14 relative to a first tube 20 in the x, y and z directions, rotation of the brazing unit 14 about the y and z axes, a desired brazing temperature, initial heat output for brazing unit 14, tube-to-tube spacing on the workpiece 16, reference measurements to be compared to measurements from the vision system, and reference patterns for matching patterns from camera images. The heat output of brazing unit 14 may be controlled by the air-fuel mixture to a torch or electrical power to an induction brazer. This allows the heat output of brazing unit 14 to be adjusted to lower levels for thinner parts, for example, to reduce likelihood of overheating the workpiece.

At 304 the brazing unit 14 is initialized by controller 200 in response to the retrieved brazing parameters. The brazing unit 14 may be positioned by controller 200 sending commands to actuators 202 and sending control signals to the brazing unit 14 to set a heat output.

At 306, the workpiece 16 is moved into an initial position. The workpiece 16 is transported by a carriage or rail system and moved to an initial position in which the first tube 20 is positioned proximate to brazing unit 14.

At 308, the brazing unit is positioned relative to the first tube 20. As noted above, this is performed by controller 200 receiving images and/or features from the vision system 30 and processing the images and/or features to detect a location of the tube 20. The brazing unit 14 is positioned by controller 200 sending commands to actuators 202 until the desired location of the brazing unit 14 relative to tube 20 is reached. Using vision system(s) 30 to adjust the location of the brazing unit 14 relative to workpiece 16 allows the system to find the tube location independently of variability in the workpiece 16.

At 310, the brazing process in begun by controller 200 commanding the brazing unit 14 to apply heat to the tube 20. At 312, controller 200 monitors the temperature of workpiece 16 to determine if the temperature at the tube 20 meets the desired brazing temperature obtained from the brazing parameters. The desired brazing temperature may be indicated as a single temperature or as a range of temperature values.

At 314, controller 200 determines if the temperature at tube 20 has reached the desired brazing temperature. This may be done in a variety of ways, depending on the type of temperature sensing performed. If a contact temperature probe or a non-contact temperature probe is used, then controller 200 receives the temperature signal from the probe and determines whether the measured temperature meets the desired brazing temperature. If the temperature probe 46 is a photosensor, then controller 200 determines if the color of the flame applied by brazing unit 14 has changed to indicate that the proper brazing temperature has been reached. This technique is described in published PCT application, PCT/US11/057192.

If at 314, the desired brazing temperature is not met, then flow proceeds to 316 where the heat applied at tube 20 may be adjusted by controller 200. This may entail moving the brazing unit 14 closer to tube 20 (if heat is too low) or farther from tube 20 (if heat is too high) along the x axis. This may also entail moving the brazing unit 14 along the z axis or the y axis to alter temperature at tube 20. Adjusting the heat at tube 20 may also involve increasing heat output of the brazing unit 14 by adjusting a fuel-air mix (for a torch) or adjusting electrical power applied (for an induction brazer). After the adjustments at 316, the process feeds back to 314 to further evaluate the brazing temperature.

Once the desired brazing temperature has been reached at 314, flow proceeds to 318 where controller 200 determines if the final tube 20 of the workpiece 16 has been brazed. If so, flow proceeds to 320 where the process ends. If the final tube 20 has not been brazed at 318, flow proceeds to 322 where the brazing unit 14 is positioned at the next tube 20. This may be performed by controller 200 moving the brazing unit 14 along the y axis an amount determined by the tube-to-tube spacing on the workpiece 16. Alternatively, the carriage handling workpiece 16 is moved along the y axis an amount determined by the tube-to-tube spacing on the workpiece 16. Flow then proceeds to 308 where the vision system 30 provide images and/or features to controller 200 to adjust the position of the brazing unit 14 relative to the next tube 20. Again, by using image analysis to position the brazing unit 14, variability in workpiece 16 does not interfere with locating the brazing unit 14 at the proper location.

The continuous positioning and heat monitoring allows the brazing system 10 to react to changing conditions. Brazing system 10 provides consistent quality with repeatable heat input control, brazer alignment and brazer displacement. The system 10 automatically aligns brazing unit 14 with the joints to be brazed, and adjusts to manufacturing tolerances stack-ups.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for joining articles, the system comprising:
for brazing items
a joining unit
a positioning unit coupled to the joining unit, the positioning unit positioning the joining unit;
a vision system obtaining an image of the item to be joined on a workpiece;
a temperature probe for monitoring a temperature of the item to be joined; and
a controller configured to (i) process the image and control a position of the joining unit relative to the item to be joined in response to the image and (ii) adjust the position of the joining unit in response to the temperature;
the controller configured to monitor the temperature;
the controller configured to move the joining unit closer to the item to be joined when the temperature is too low;
the controller configured to move the joining unit farther from the item to be joined when the temperature is too high;
the controller configured to repeatedly monitor the temperature and move the joining unit until a desired brazing temperature is met at the item to be joined.

2. The system of claim 1 wherein:
wherein the controller is configured to adjust heat output of the joining unit in response to the temperature.

3. The system of claim 2 wherein:
the joining unit includes a torch, the controller configured to adjust fuel to the torch to adjust the heat output.

4. The system of claim 2 wherein:
the joining unit includes an induction brazer, the controller configured to adjust power to the induction brazer to adjust the heat output.

5. The system of claim 1 wherein:
the controller is configured to process the image to detect a feature in the image.

6. The system of claim 5 wherein:
the controller is configured to process the image to obtain a measurement of the item to be joined from the image.

7. The system of claim 1 wherein:
the temperature probe is a non-contact temperature probe measuring temperature at a specific predetermined location near the item to be joined.

8. The system of claim 1 wherein:
the temperature probe is a contact temperature probe measuring temperature on the workpiece at a position distanced from the item to be joined.

9. The system of claim 1 wherein:
the temperature probe is photosensor measuring temperature in response to a color of a flame from the joining unit.

10. The system of claim 1 wherein:
the vision system performs processing the image.

* * * * *